(12) United States Patent
Maejima et al.

(10) Patent No.: US 12,085,318 B2
(45) Date of Patent: Sep. 10, 2024

(54) REFRIGERATION CYCLE APPARATUS

(71) Applicant: DAIKIN INDUSTRIES, LTD., Osaka (JP)

(72) Inventors: Yukiko Maejima, Osaka (JP); Masaru Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/266,914

(22) PCT Filed: Jun. 5, 2019

(86) PCT No.: PCT/JP2019/022392
§ 371 (c)(1),
(2) Date: Feb. 8, 2021

(87) PCT Pub. No.: WO2020/039692
PCT Pub. Date: Feb. 27, 2020

(65) Prior Publication Data
US 2021/0262710 A1    Aug. 26, 2021

(30) Foreign Application Priority Data

Aug. 20, 2018    (JP) .................................. 2018-154130

(51) Int. Cl.
*F25B 31/02*    (2006.01)
*F25B 31/00*    (2006.01)
(Continued)

(52) U.S. Cl.
CPC .......... *F25B 31/026* (2013.01); *F25B 31/002* (2013.01); *H02K 3/44* (2013.01); *H02K 3/30* (2013.01)

(58) Field of Classification Search
CPC .................. F25B 31/026; F25B 31/002; F25B 2600/0262; F25B 1/04; F04C 2210/263; F04B 39/0215
See application file for complete search history.

(56) References Cited

U.S. PATENT DOCUMENTS

| 6,082,132 A | 7/2000 | Numoto et al. |
| 6,189,322 B1 | 2/2001 | Ishihara et al. |
| (Continued) | | |

FOREIGN PATENT DOCUMENTS

| CN | 104518598 B | * 5/2018 | .............. F04C 23/02 |
| CN | 207977817 U | * 10/2018 | |
| (Continued) | | | |

OTHER PUBLICATIONS

International Preliminary Report of corresponding PCT Application No. PCT/JP2019/022392 dated Mar. 4, 2021.
(Continued)

*Primary Examiner* — Frantz F Jules
*Assistant Examiner* — Webeshet Mengesha
(74) *Attorney, Agent, or Firm* — Global IP Counselors, LLP

(57) ABSTRACT

A refrigeration cycle apparatus includes a refrigerant and a refrigeration cycle circuit. The refrigeration cycle circuit includes a heat exchanger and a compressor, and circulates the refrigerant. The refrigerant is a single hydrofluoroolefin (HFO)-based refrigerant or a mixed refrigerant. In the mixed refrigerant, an HFO-based refrigerant is mixed at a mixing ratio of 10% by weight or more. The compressor includes a motor. The motor includes a resin component. The resin component includes a polyimide having a terminal blocked with a terminal group.

12 Claims, 6 Drawing Sheets

(51) Int. Cl.
*H02K 3/44* (2006.01)
*H02K 3/30* (2006.01)

(56) References Cited

U.S. PATENT DOCUMENTS

| | | | |
|---|---|---|---|
| 8,507,615 B2* | 8/2013 | Moralez | C08G 73/1014 |
| | | | 525/420 |
| 2007/0031275 A1 | 2/2007 | Nogawa et al. | |
| 2011/0011123 A1* | 1/2011 | Matsuura | F04B 39/023 |
| | | | 62/468 |
| 2012/0024007 A1 | 2/2012 | Ota et al. | |
| 2014/0134018 A1 | 5/2014 | Tolbert, Jr. et al. | |
| 2017/0138642 A1 | 5/2017 | Ueno et al. | |
| 2017/0146265 A1* | 5/2017 | Fujitaka | C09K 5/045 |
| 2017/0146284 A1 | 5/2017 | Matsunaga et al. | |

FOREIGN PATENT DOCUMENTS

| | | |
|---|---|---|
| EP | 3 795 925 A1 | 3/2021 |
| JP | 9-71645 A | 3/1997 |
| JP | 10-101930 A | 4/1998 |
| JP | 11-230628 A | 8/1999 |
| JP | 2000-73951 A | 3/2000 |
| JP | 2002-147354 A | 5/2002 |
| JP | 2002147354 * | 5/2002 |
| JP | 2012-31239 A | 2/2012 |
| JP | 4932793 B2 | 2/2012 |
| JP | 2013-28695 A | 2/2013 |
| JP | 5339788 B2 | 8/2013 |
| JP | 2014-81119 A | 5/2014 |
| JP | WO2016/024576 A1 | 2/2016 |
| JP | 2016-56340 A | 4/2016 |
| JP | 6105511 B2 | 3/2017 |
| WO | 2015/054289 A2 | 4/2015 |
| WO | 2015/174032 A1 | 11/2015 |
| WO | 2017/145278 A1 | 8/2017 |

OTHER PUBLICATIONS

International Search Report of corresponding PCT Application No. PCT/JP2019/022392 dated Jul. 30, 2019.
European Search Report of corresponding EP Application No. 19 85 2339.1 dated May 2, 2022.

* cited by examiner

REFRIGERATION CYCLE APPARATUS

CROSS-REFERENCE TO RELATED APPLICATIONS

This U.S. National stage application claims priority under 35 U.S.C. § 119(a) to Japanese Patent Application No. 2018-154130, filed in Japan on Aug. 20, 2018, the entire contents of which are hereby incorporated herein by reference.

BACKGROUND

Field of the Invention

A refrigeration cycle apparatus for use in, for example, a cooling operation or a heating operation.

Background Information

Japanese Patent No. 4932793 discloses a refrigeration cycle apparatus that adopts HFO-1234yf as a refrigerant.

SUMMARY

Some components for use in a refrigeration cycle apparatus include a resin material. Some kinds of resin materials chemically react with a refrigerant to generate an acid. The resultant acid may induce corrosion or degradation of the component.

A first aspect provides a refrigeration cycle apparatus including a refrigerant and a refrigeration cycle circuit. The refrigeration cycle circuit includes a compressor and circulates the refrigerant. The refrigerant is a single hydrofluoroolefin (HFO)-based refrigerant or a mixed refrigerant. In the mixed refrigerant, an HFO-based refrigerant is mixed at a mixing ratio of 10% by weight or more. The compressor includes a motor. The motor includes a resin component. The resin component includes a polyimide having a terminal blocked with a terminal group.

According to this configuration, the motor includes the resin component including a polyimide (PI) having a terminal blocked with a terminal group. In the case of using such a resin component, the amount of the acid generated by the reaction between the resin component and an HFO-based refrigerant is smaller than in the case of using a resin component including a PI having an unblocked terminal group. Therefore, the components in the refrigeration cycle system are less susceptible to corrosion by an acid.

A second aspect provides the refrigeration cycle apparatus according to the first aspect, wherein the ratio of the resin component to the refrigerant is 0.2% by weight or more.

According to this configuration, the ratio of the resin component to the refrigerant is 0.2% by weight or more. This configuration therefore restrains acid generation since the resin component being large in amount is less susceptible to reaction with the HFO-based refrigerant.

A third aspect provides the refrigeration cycle apparatus according to the first or second aspect, further including a refrigerating machine oil stored in the compressor and an acid scavenger added to the refrigerating machine oil. The ratio of the acid scavenger to the refrigerant is 1.6% by weight or less.

According to this configuration, the ratio of the acid scavenger to the refrigerant is 1.6% by weight or less. This configuration therefore restrains degradation in lubricity of the refrigerating machine oil owing to the acid scavenger.

A fourth aspect provides the refrigeration cycle apparatus according to any one of the first to third aspects, wherein the motor includes an electric wire covered with an insulating covering and includes an insulating sheet. The resin component includes the insulating covering or the insulating sheet.

According to this configuration, the insulating covering or the insulating sheet includes the PI. This configuration therefore suppresses degradation in heat resistance of the motor.

A fifth aspect provides the refrigeration cycle apparatus according to any one of the first to fourth aspects, wherein the resin component includes at least one selected from an insulating sleeve or a binding cord in the motor.

According to this configuration, the component used in the motor includes the PI having a terminal blocked with a terminal group. This configuration therefore restrains acid generation in the motor, and also restrains corrosion of the motor.

A sixth aspect provides the refrigeration cycle apparatus according to any one of the first to fifth aspects, further including a sliding portion including a polyimide having a terminal blocked with a terminal group.

According to this configuration, the sliding portion includes a PI having a terminal blocked with a terminal group. This configuration therefore restrains acid generation in the sliding portion, and also restrains corrosion of the sliding portion.

DETAILED DESCRIPTION OF EMBODIMENT(S)

(1) Overall Configuration

Figure 1:
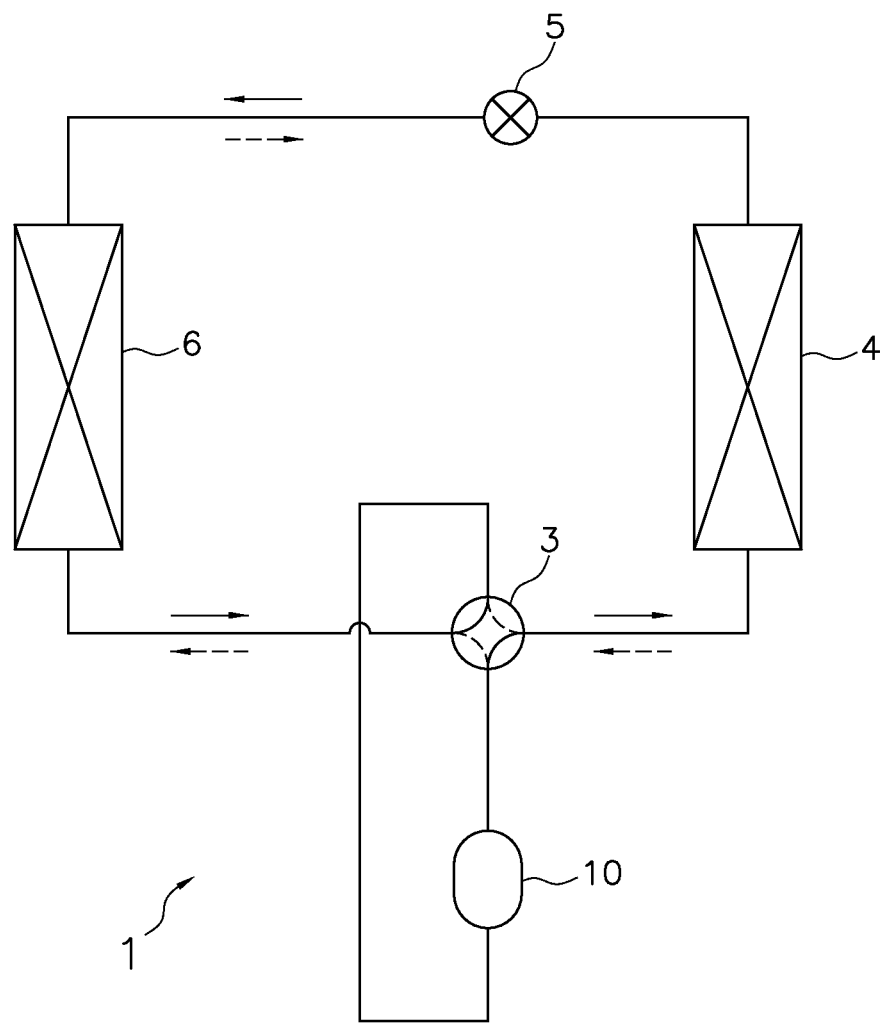
FIG. 1 is a schematic diagram of a refrigeration cycle apparatus 1.

FIG. 1 illustrates a refrigeration cycle apparatus 1 according to an embodiment. The refrigeration cycle apparatus 1 includes a refrigeration cycle circuit and a refrigerant that circulates through the refrigeration cycle circuit.

(1-1) Refrigerant

The refrigerant is a single HFO-based refrigerant or a mixed refrigerant. In a case where the refrigerant is a mixed refrigerant, the mixing ratio of an HFO-based refrigerant in the mixed refrigerant is 10% by weight or more, and preferably 14% by weight or more. Examples of the HFO-based refrigerant include R1123, R1234yf, and R1234ze. Examples of 10 the refrigerant to be used herein may include Refrigerants 1 to 75 listed in the following table.

TABLE 1

| | Name | Composition | (Ratio: wt %) |
|---|---|---|---|
| Refrigerant 1 | | R32/R125/R1234yf | (15/25/60) |
| Refrigerant 2 | R513B | R1234yf/R1234a | (58.5/41.5) |
| Refrigerant 3 | R1234yf | R1234yf | (100) |
| Refrigerant 4 | R463A | R744/R32/R1234yf/R134a | (6.0/36.0/30.0/14.0/14.0) |
| Refrigerant 5 | R452B | R32/R125/R1234yf | (67/7/26) |
| Refrigerant 6 | | R32/R1234yf | (72.5/27.5) |
| Refrigerant 7 | R454B | R32/R1234yf | (68.9/31.1) |
| Refrigerant 8 | R449A | R32/R125/R1234yf/R134a | (24.3/24.7/25.3/25.7) |
| Refrigerant 9 | R452A | R32/R125/R1234yf | (11.0/59.0/30.0) |
| Refrigerant 10 | R454A | R32/R1234yf | (35/65) |
| Refrigerant 11 | R449C | R32/R125/R1234yf/R134a | (20/20/31/29) |
| Refrigerant 12 | R454C | R32/R1234yf | (21.5/78.5) |
| Refrigerant 13 | R513A | R1234yf/R134a | (56/44) |
| Refrigerant 14 | R1336mzz(Z) | R1336mzz(Z) | (100) |
| Refrigerant 15 | R1336mzz(Z) | R1336mzz(Z) | (100) |
| Refrigerant 16 | R514A | R1336mzz(Z)/R1130(E) | (74.7/25.3) |
| Refrigerant 17 | | R32/R125/R1234ze(E) | (68/15/17) |
| Refrigerant 18 | R447B | R32/R125/R1234ze(E) | (68/8/24) |
| Refrigerant 19 | R447A | R32/R125/R1234ze(E) | (68/3.5/28.5) |
| Refrigerant 20 | | R32/R1234yf/R1234ze(E) | (73/15/12) |
| Refrigerant 21 | | R32/R1234ze(E) | (72/27) |
| Refrigerant 22 | R446A | R32/R1234ze(E)/Butane | (68/29/3) |
| Refrigerant 23 | R448A | R32/R125/R1234yf/R134a/R1234ze(E) | (26/26/20/21/7) |
| Refrigerant 24 | | R32/R125/R1234yf/R134a/R1234ze(E) | (25/25/9/21/20) |
| Refrigerant 25 | | R32/R125/R1234yf/R134a | (25/25/30/20) |
| Refrigerant 26 | | R32/R1234yf/R152a/R1234ze(E) | (40/20/10/30) |
| Refrigerant 27 | R455A | R744/R32/R1234yf | (3.0/21.5/75.5) |
| Refrigerant 28 | | R32/R125/R134a/R1234yf | (13/13/31/43) |
| Refrigerant 29 | | R32/R125/R1234yf/R134a/R1234ze(E) | (12.5/12.5/13.5/31.5/30) |
| Refrigerant 30 | | R32/R152a/R1234ze(E) | (45/20/35) |
| Refrigerant 31 | R444B | R32/R152a/R1234ze(E) | (41.5/10/48.5) |
| Refrigerant 32 | | R1234yf/R134a/R1234ze(E) | (18/42/40) |
| Refrigerant 33 | R450A | R134a/R1234ze(E) | (42/58) |
| Refrigerant 34 | R515A | R1234ze(E)/R227ea | (88/12) |
| Refrigerant 35 | R515B | R1234ze(E)/R227ea | (91.1/8.9) |
| Refrigerant 36 | R1234ze(E) | R1234ze(E) | (100) |
| Refrigerant 37 | R1234zd(E) | R1234zd(E) | (100) |
| Refrigerant 38 | | R32/R125/CF3I | (4.90/11.5/39.5) |
| Refrigerant 39 | | R32/R1234yf/R134a | (50/40/10) |
| Refrigerant 40 | R459A | R32/R1234yf/R1234ze(E) | (68/26/6) |
| Refrigerant 41 | R452C | R32/R125/R1234yf | (12.5/61/26.5) |
| Refrigerant 42 | R449B | R32/R125/R1234yf/R134a | (25.2/24.3/23.2/27.3) |
| Refrigerant 43 | | R32/R1234yf/R134a | (28/51/21) |
| Refrigerant 44 | | R32/R1234yf/R152a | (35/55/10) |
| Refrigerant 45 | | R32/R1234yf | (29/71) |
| Refrigerant 46 | R465A | R-32/R290/R1234yf | (21.0/7.9/71.1) |
| Refrigerant 47 | R457A | R32/R1234yf/R152a | (18/70/12) |
| Refrigerant 48 | | R32/R125/R1234yf/R134a | (25/30/20/25) |
| Refrigerant 49 | | R32/R125/R1234yf/R134a | |
| Refrigerant 50 | | R32/R1234yf/R134a | (6/31/63) |
| Refrigerant 51 | | R1234yf/R134a/R152a | (82/7/11) |
| Refrigerant 52 | R516A | R1234yf/R134a/R152a | (77.5/8.5/14.0) |
| Refrigerant 53 | | R1123/R32 | (32/68) |
| Refrigerant 54 | | R1123/R32 | (40/60) |
| Refrigerant 55 | | R1123/R32 | (45/55) |
| Refrigerant 56 | | R1123/R32/R1234yf | (19/55/26) |
| Refrigerant 57 | | R1123/R32/R1234yf | (40/44/16) |
| Refrigerant 58 | | R1123 | (100) |
| Refrigerant 59 | R1224yd(Z) | R1224yd(Z) | (100) |
| Refrigerant 60 | | R744/R32/R1234ze(E) | (6/60/34) |
| Refrigerant 61 | | R32/R134a/R1234ze | (76/6/18) |
| Refrigerant 62 | R460 | R32/R125/R134a/R1234ze(E) | (12/52/14/22) |
| Refrigerant 63 | R459B | R32/R1234yf/R1234ze(E) | (21/69/10) |
| Refrigerant 64 | R460B | R32/R125/R134a/R1234ze(E) | (28/25/20/27) |
| Refrigerant 65 | | R744/R32/R1234ze(E) | (7/30/63) |
| Refrigerant 66 | 456A | R32/R134a/R1234ze(E) | (6/45/49) |
| Refrigerant 67 | R445A | R744/R134a/R1234ze(E) | (6.0/9.0/85.0) |
| Refrigerant 68 | R444A | R32/R152a/R1234ze(E) | (12/5/83) |
| Refrigerant 69 | R1132a | R1132a | (100) |
| Refrigerant 70 | | R1132(E)/R1123 | (65/35) |
| Refrigerant 71 | | R1132(E)/R1123/R1234yf | (70/20/10) |
| Refrigerant 72 | | R1132(E)/R1123/R1234yf/R32 | (60/5.7/20/14.3) |

TABLE 1-continued

| Name | Composition | (Ratio: wt %) |
|---|---|---|
| Refrigerant 73 | R1132(E)/R1234yf/R32 | (50/35.7/14.3) |
| Refrigerant 74 | R1132(E)/R1234yf/R32/CO2 | (35.7/47/14.3/3) |
| Refrigerant 75 | R1132(E)/R1123/R32 | (30/55.7/14.3) |

(1-2) Refrigeration Cycle Circuit

The refrigeration cycle circuit includes a compressor 10, a four-way switching valve 3, a heat source-side heat exchanger 4, an expansion valve 5, and a usage-side heat exchanger 6. A configuration of the compressor 10 will be described below.

When the four-way switching valve 3 establishes a connection illustrated with a solid line in FIG. 1, the usage-side heat exchanger 6 provides the user with cold. When the four-way switching valve 3 establishes a connection illustrated with a broken line in FIG. 1, the usage-side heat exchanger 6 provides the user with heat.

The expansion valve 5 has a sliding portion. The sliding portion of the expansion valve 5 is coated with a coating material. The coating material may include a PI (polyimide) having a terminal blocked with a terminal group. Details of the PI having a terminal blocked with a terminal group will be described below.

(2) Specific Configuration of Compressor 10

Figure 2:
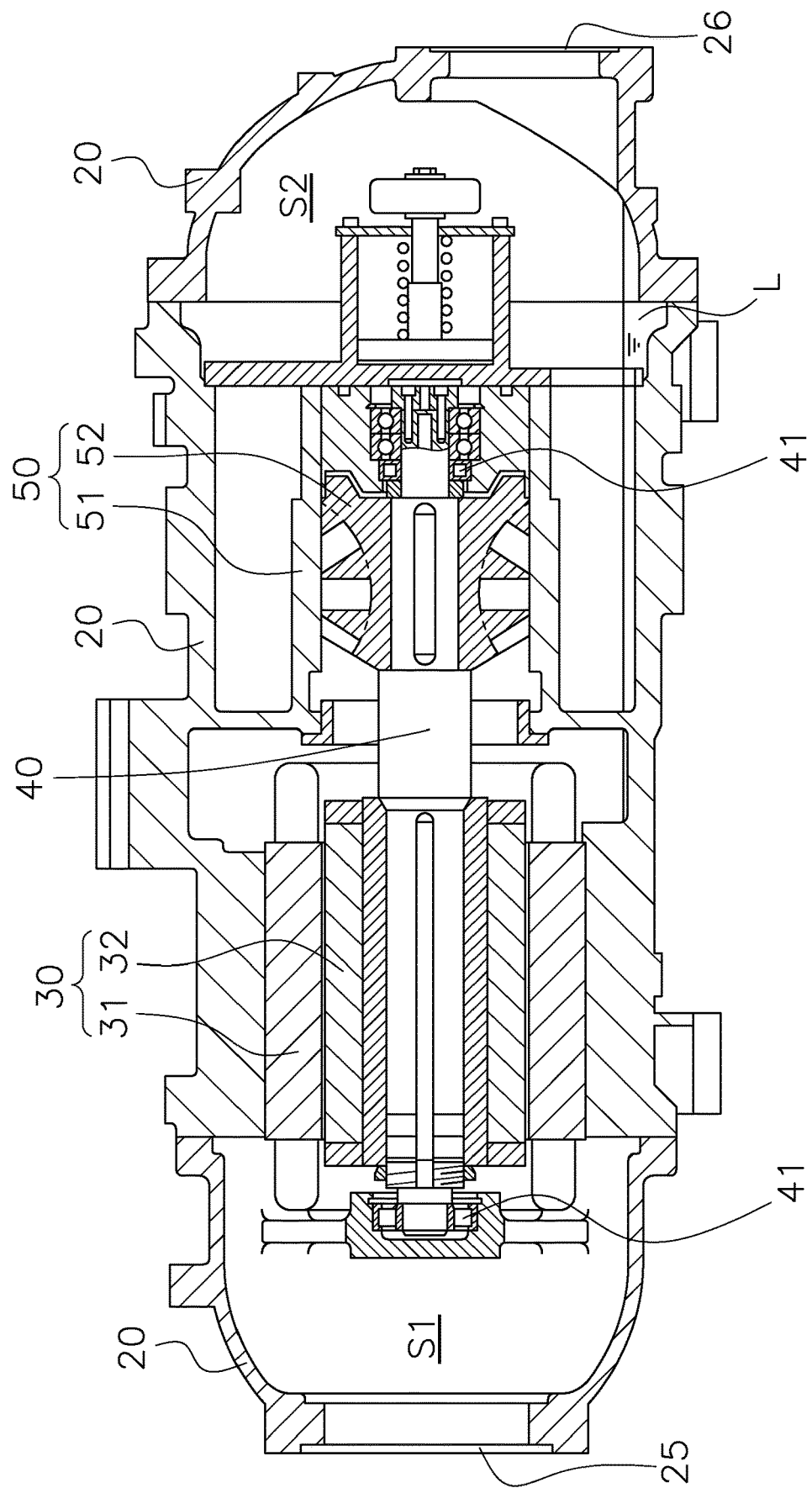
FIG. 2 is a sectional view of a compressor 10.
Figure 3:
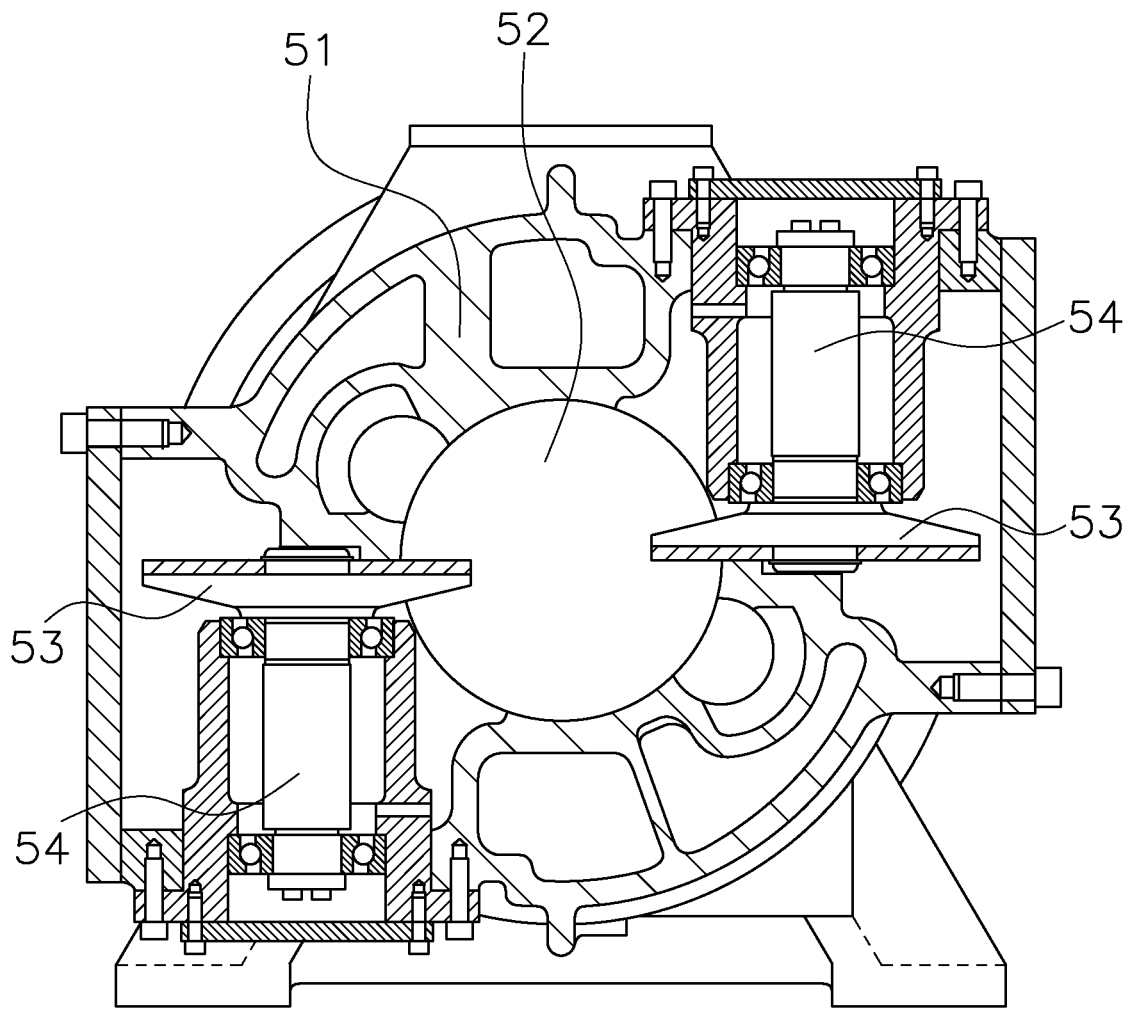
FIG. 3 is a sectional view of the compressor 10.

FIGS. 2 and 3 each illustrate the compressor 10 of a screw type. The compressor 10 includes a casing 20, a motor 30, a shaft 40, and a compression mechanism 50.

(2-1) Casing 20

The casing 20 is a cylindrical container extending horizontally in FIG. 2. The casing 20 has an internal space divided into a low-pressure space S1 and a high-pressure space S2. A refrigerating machine oil L is stored in the lower side of the high-pressure space S2. The refrigerating machine oil L is fed to each sliding portion in the compressor 10 through an oil feed path (not illustrated).

The casing 20 has a suction port 25 at the low-pressure space S1. The casing 20 also has a discharge port 26 at the high-pressure space S2. A low-pressure gas refrigerant is sucked into the compressor 10 through the suction port 25. A high-pressure gas refrigerant is discharged from the compressor 10 through the discharge port 26.

(2-2) Motor 30

The motor 30 is disposed in the low-pressure space S1. As illustrated in FIG. 2, the motor 30 includes a stator 31 and a rotor 32. The stator 31 is fixed to the inner peripheral face of the casing 20. The rotor 32 is disposed in the cavity of the stator 31, and is fixed to the shaft 40.

Figure 4:
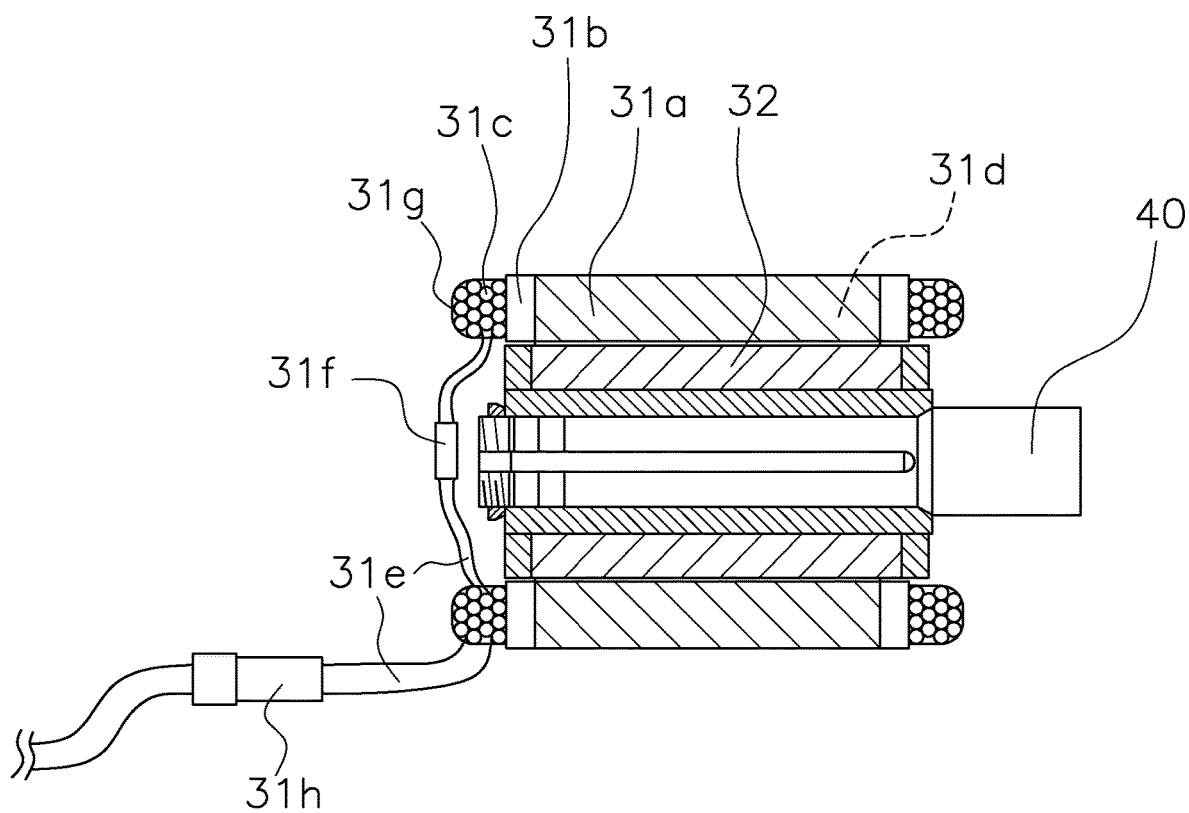
FIG. 4 is a sectional view of a motor 30.

As illustrated in FIG. 4, the stator 31 includes a stator core 31a, an insulator 31b, a coil winding 31c, an insulating sheet 31d, an insulated electric wire 31e, an insulating sleeve 31f, a binding cord 31g, and a cluster block 31h.

The stator core 31a includes a stack of steel plates. The insulator 31b includes a resin, and is disposed on the end face of the stator core 31a. The coil winding 31c includes a conductive material, and is wound around the stator core 31a and the insulator 31b. The insulating sheet 31d includes a resin, and is located in, for example, a slot between adjacent coil windings 31c. The insulated electric wire 31e is an electric wire covered with an insulating covering. The insulating sleeve 31f includes a resin, and insulates a joint in the insulated electric wire 31e from the surroundings. The binding cord 31g includes a resin, and fixes the insulated electric wire 31e to the insulator 31b. The cluster block 31h is a connector housing including a resin. A plurality of insulated electric wires 31e are detachably connected in the cluster block 31h.

The insulator 31b, the insulating sheet 31d, the covering of the insulated electric wire 31e, the insulating sleeve 31f, the binding cord 31g, and the cluster block 31h are each a resin component. Among the components, the covering of the insulated electric wire 31e and the insulating sheet 31d include a PI (polyimide) having a terminal blocked with a terminal group. Details of the PI having a terminal blocked with a terminal group will be described below.

The insulating sleeve 31f and the binding cord 31g may also include a PI having a terminal blocked with a terminal group.

Meanwhile, the insulator 31b and the cluster block 31h include a resin material other than a PI. Examples of the resin material other than a PI include PET (polyethylene terephthalate), PA (polyamide) (PAS), LCP (liquid crystal polymer), PBT (polyethylene terephthalate), phenol resins, melamine resins, PEEK (polyether ether ketone), PTFE (polytetrafluoroethylene), PAI (polyamideimide), PPS (polyphenylene sulfide), and PEN (polyethylene naphthalate).

The ratio of the PI having a terminal blocked with a terminal group to the refrigerant is 1.5% by weight or more.

(2-3) Shaft 40

Referring back to FIGS. 2 and 3, the shaft 40 is configured to transmit the power generated by the motor 30 to the compression mechanism 50. The shaft 40 is fixed to the rotor 32 to rotate together with the rotor 32. The shaft 40 is rotatably supported by a bearing 41. In a case where the bearing 41 is a sliding bearing, the resin material included in the sliding bearing may include a PI having a terminal blocked with a terminal group.

(2-4) Compression Mechanism 50

The compression mechanism 50 is configured to compress the low-pressure gas refrigerant to generate the high-pressure gas refrigerant. The compression mechanism 50 includes a cylinder 51, a screw rotor 52, a gate rotor 53, and a gate rotor supporting portion 54.

(2-4-1) Cylinder 51

The cylinder 51 forms a part of the casing 20. The cylinder 51 accommodates the screw rotor 52. The cylinder 51 has gaps through which gates 53a (to be described below) pass.

(2-4-2) Screw Rotor 52

The screw rotor 52 is a metal member having a substantially columnar shape. The screw rotor 52 is coupled to the shaft 40. The screw rotor 52 is rotatable together with the shaft 40. The screw rotor 52 has an outer diameter that is slightly smaller than the inner diameter of the cylinder 51.

Figure 5:
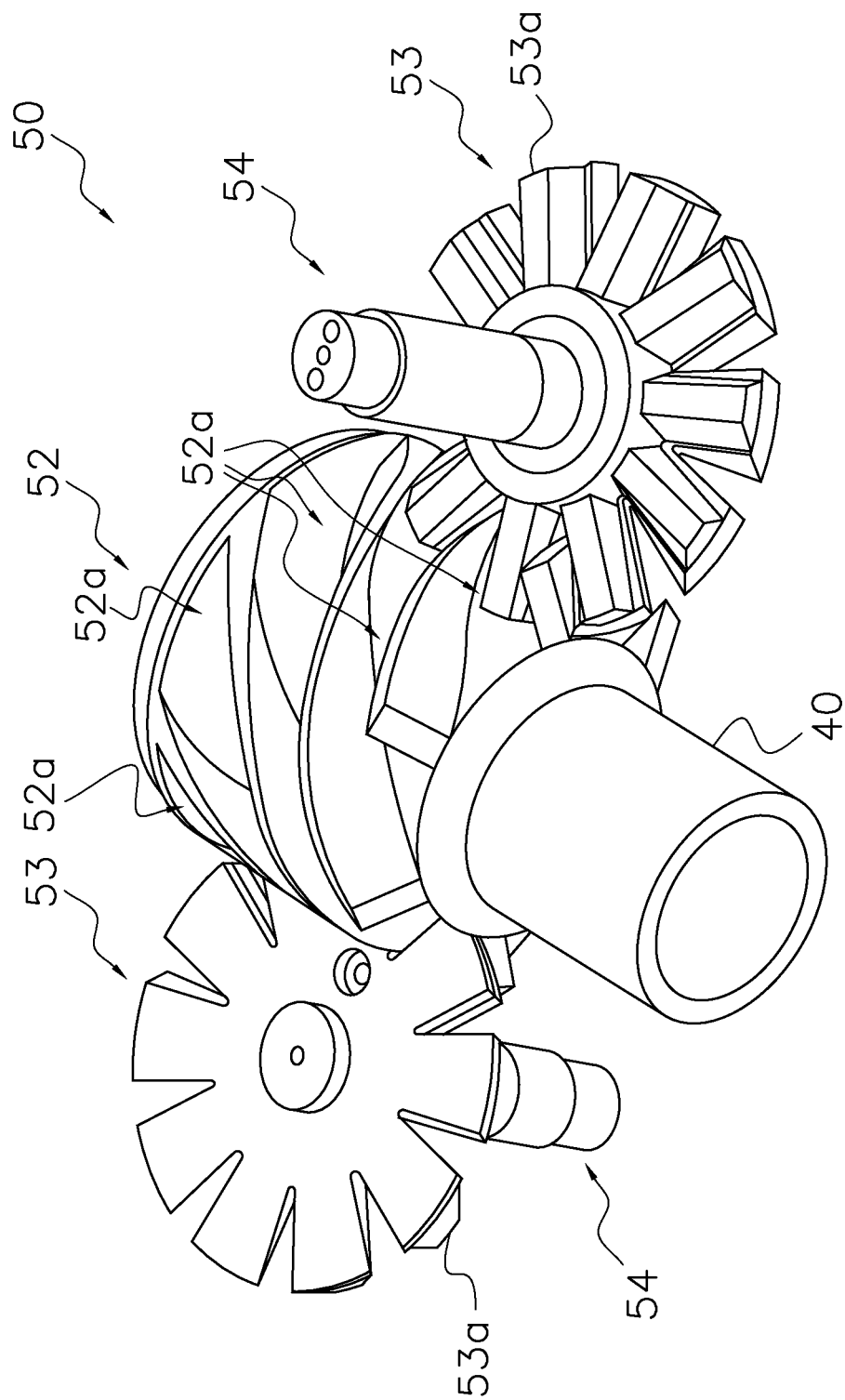
FIG. 5 is a perspective view of a screw rotor 52 and a gate rotor 53.

FIG. 5 illustrates the screw rotor 52 and the gate rotor 53. FIG. 5 does not illustrate the cylinder 51. The screw rotor 52 has, in its outer periphery, a plurality of spiral grooves 52*a* extending spirally along the axis of the screw rotor 52.

(2-4-3) Gate Rotor 53

The gate rotor 53 has the plurality of gates 53*a* extending radially. The gates 53*a* that pass through a gap in the cylinder 51 mesh with the spiral grooves 52*a* in the screw rotor 52. The screw rotor 52 receives rotational force from the shaft 40 to rotate, and the rotation of the screw rotor 52 causes the movement of the spiral grooves 52*a*. The movement of the spiral grooves 52*a* causes the movement of the gates 53*a*, and the movement of the gates 53*a* causes the rotation of the gate rotors 53.

(2-4-4) Gate Rotor Supporting Portion 54

The gate rotor supporting portion 54 supports the corresponding gate rotor 53 in a rotatable manner. Two gate rotor supporting portions 54 are arranged symmetrically with each other with respect to the axis of the screw rotor 52.

(2-5) Others

The screw rotor 52 slides along the cylinder 51 and the gate rotor 53. Each sliding portion may be coated with a coating material. For example, the coating material may include a PI having a terminal blocked with a terminal group.

(3) Compression Operation

With reference to FIG. 2, the low-pressure gas refrigerant flows into the low-pressure space S1 through the suction port 25. In the compression mechanism 50, a space defined by the cylinder 51, the spiral grooves 52*a*, and the gates 53*a* serves as a compression chamber. As the screw rotor 52 rotates, the compression chamber in the low-pressure space S1 moves toward the high-pressure space S2 gradually decreasing the volume of the compression chamber. The low-pressure gas refrigerant is thus compressed, and the resultant high-pressure gas refrigerant flows into the high-pressure space S2. Finally, the high-pressure gas refrigerant is discharged outside from the compressor 10 through the discharge port 26.

(4) Refrigerating Machine Oil L

The refrigerating machine oil L is a lubricating oil for prevention of wear and seizure of the sliding portion in the compressor 10. The refrigerating machine oil L mainly includes a base oil, an acid scavenger, an extreme pressure agent, and an antioxidant.

(4-1) Base Oil

The base oil is a mineral oil or a synthetic oil. The base oil to be appropriately selected herein has favorable compatibility with a refrigerant for use in the refrigeration cycle apparatus 1. Examples of the mineral oil include a naphthenic mineral oil and a paraffinic mineral oil. Examples of the synthetic oil include ester compounds, ether compounds, poly-α-olefin, and alkylbenzene. Specific examples of the synthetic oil include polyvinyl ether, polyol ester, and polyalkylene glycol. In this embodiment, the base oil is preferably a synthetic oil such as a polyvinyl ether or a polyol ester. Alternatively, the base oil may be a mixture of two or more of the mineral oils or synthetic oils.

(4-2) Acid Scavenger

The acid scavenger is an additive that reacts with an acid resulting from decomposition of a refrigerant to restrain degradation of the refrigerating machine oil L owing to the acid. Examples of the acid scavenger include epoxy compounds, carbodiimide compounds, and terpene-based compounds. Specific examples of the acid scavenger include 2-ethylhexyl glycidyl ether, phenyl glycidyl ether, epoxidized cyclohexylcarbinol, di(alkylphenyl)carbodiimide, and β-pinene.

(4-3) Extreme Pressure Agent

The extreme pressure agent is an additive for prevention of wear and seizure of the sliding portion. The refrigerating machine oil L forms an oil membrane between the surfaces of the members sliding along each other at the sliding portion, thereby preventing contact between the sliding members. In a case where the refrigeration cycle apparatus 1 adopts a low-viscosity refrigerating machine oil L such as a polyvinyl ether and in a case where high pressure is applied to the sliding members, the sliding members are apt to come into contact with each other. The extreme pressure agent forms a coating by reaction with the surfaces of the members sliding along each other at the sliding portion, thereby suppressing occurrence of wear and seizure. Examples of the extreme pressure agent include phosphate esters, phosphite esters, thiophosphates, sulfurized esters, sulfides, and thiobisphenol. Specific examples of the extreme pressure agent include tricresyl phosphate (TCP), triphenyl phosphate (TPP), triphenyl phosphorothioate (TPPT), amines, C11-C14 side chain alkyls, monohexyl phosphate, and dihexyl phosphate. TCP adsorbs to the surface of the sliding member, and decomposes the sliding member to form a phosphate coating.

(4-4) Antioxidant

The antioxidant is an additive for prevention of oxidation of the refrigerating machine oil L. Specific examples of the antioxidant include zinc dithiophosphate, organic sulfur compounds, phenolic antioxidants such as 2,6-di-tert-butyl-4-methylphenol, 2,6-di-tert-butyl-4-ethylphenol, and 2,2-methylenebis(4-methyl-6-tert-butylphenol), amine-based antioxidants such as phenyl-α-naphthylamine and N,N'-diphenyl-p-phenylenediamine, and N,N'-disalicylidene-1,2-diaminopropane.

(4-5) Mixing Ratio

The content of the acid scavenger in the refrigerating machine oil L is, for example, 1.0% by weight or more. The acid scavenger thus restrains degradation of the refrigerating machine oil L and corrosion of the expansion valve 5 owing to an acid. The acid scavenger also restrains corrosion of other components in the refrigeration cycle apparatus 1. Therefore, the use of the refrigerating machine oil L according to this embodiment improves the reliability of the refrigeration cycle apparatus 1.

The ratio of the acid scavenger to the refrigerant is 1.6% by weight or less. At the ratio, it is possible to restrain degradation in lubricity of the refrigerating machine oil L.

(5) PI Having Blocked Terminal Group

A PI (polyimide) is represented by the following formula.

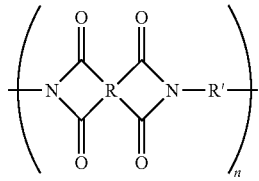
[Chem. 1]

The terminal of the PI is blocked with a terminal group. Here, the term "terminal group" refers to a terminal group other than a terminal hydrogen group. Not all the terminals need to be blocked with a terminal group in the PI having a blocked terminal group. In some cases, the PI is effective in which 50% of the terminals are blocked. Examples of the structure of the terminal group are shown below.

(5-1) First Structural Example

In First Structural Example, the PI is blocked with a C1-C10 alkyl group.

That is, the terminal group is represented by one of the following formulae.

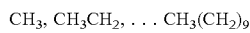
[Chem. 2]

(5-2) Second Structure Example

In Second Structural Example, the PI is blocked with phthalic anhydride or a derivative of phthalic anhydride. That is, the terminal group is represented by the following formula.

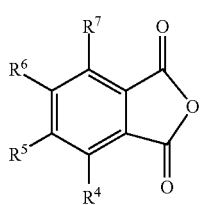
[Chem. 3]

Herein one of R4, R5, R6, and R7 is the terminal of the polyimide. The others are each independently represented by the structure of H, Br, Cl, F, alkyl, alkoxy, or fluoroalkyl.

(5-3) Third Structure Example

In Third Structural Example, the terminal group is represented by the following formula.

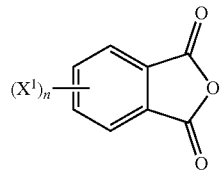
[Chem. 4]

Herein n is an integer of 1 or more and 4 or less. $X^1$ represents a non-reactive electron-withdrawing group. One of the plurality of X's is the terminal of the polyimide. The others may be the same or different groups.

(5-4) Method of Blocking Terminal

The method of blocking the terminal of the PI is not limited, and any conventionally known method may be used.

In a preferable method, a terminal blocking agent is used. Any conventionally known terminal blocking agent may be used.

Typical examples of the terminal blocking agent for block of a terminal amino group include acid anhydrides such as C1-C10 alkyl groups, phthalic anhydride, 1,2-cyclohexanedicarboxylic anhydride, 4-methylcyclohexane-1,2-dicarboxylic anhydride, and (2-methyl-2-propenyl) succinic anhydride: and organic acid chlorides such as benzoic acid chloride.

Examples of the terminal blocking agent for block of a terminal acid anhydride group include amine compounds such as 3-aminophenylacetylene, aniline, and cyclohexylamine. Such a terminal blocking agent may be used for the terminal block of the PI.

(6) Test (6-1) PI Having Unblocked Terminal

The inventors have found that a PI having an unblocked terminal is apt to generate an acid by reaction with an HFO-based refrigerant. The inventors have found the fact through the test performed by the following method.

An ether oil, a refrigerant, and a resin material are put in a container. Next, the container is left for 500 hours while the inside of the container is kept at 140° C. Finally, the acid value of the mixture in the container is measured.

In this test, HFO refrigerants (R1234ze and R1234yf) and an HFC refrigerant (R134a) were each used as a refrigerant. As a resin material, PET (polyethylene terephthalate), a PA (polyamide), and a PI (polyimide) were each used.

Figure 6:
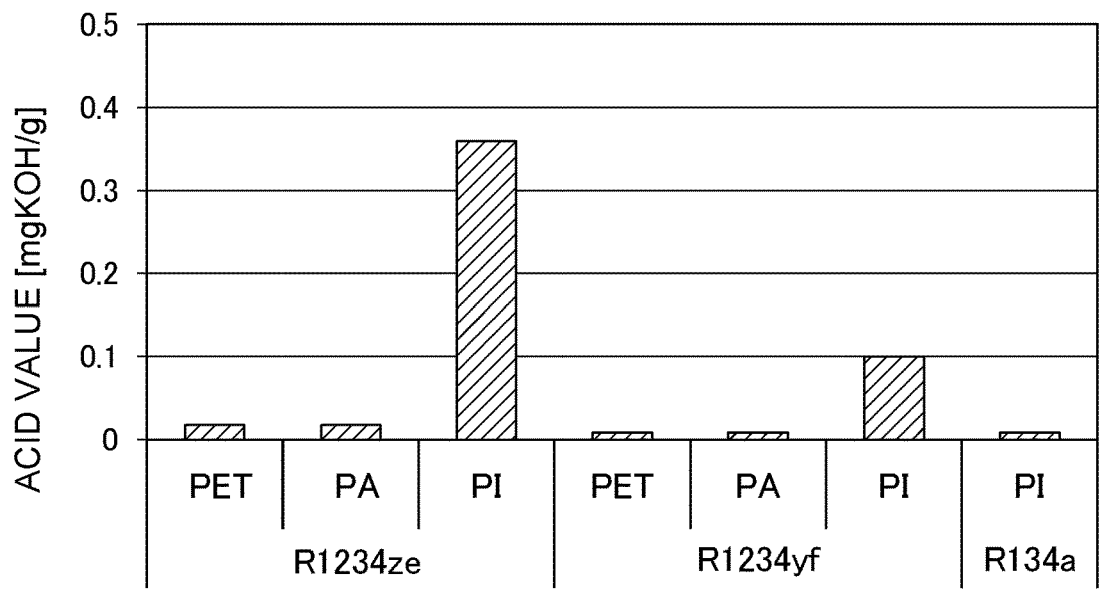
FIG. 6 shows test results on the tendency to generate an acid in a combination of a resin and a refrigerant.

FIG. 6 shows the test results. It is understood that the acid value is significantly higher in the cases that an HFO refrigerant (R1234ze or R1234yf) and a PI were put together in a container than in other cases.

(6-2) PI Having Terminal Blocked with Terminal Group

The inventors have found that a PI having a terminal blocked with a terminal group is less likely to generate an acid because the PI is less likely to react with an HFO-based refrigerant. The inventors have found the fact through the test performed in the same manner as in the method described in (6-1).

In this test, HFO refrigerants (R1234ze and R1234yf) were each used as a refrigerant. As a resin material, a PI having an unblocked terminal and a PI having a blocked terminal were each used.

Figure 7:
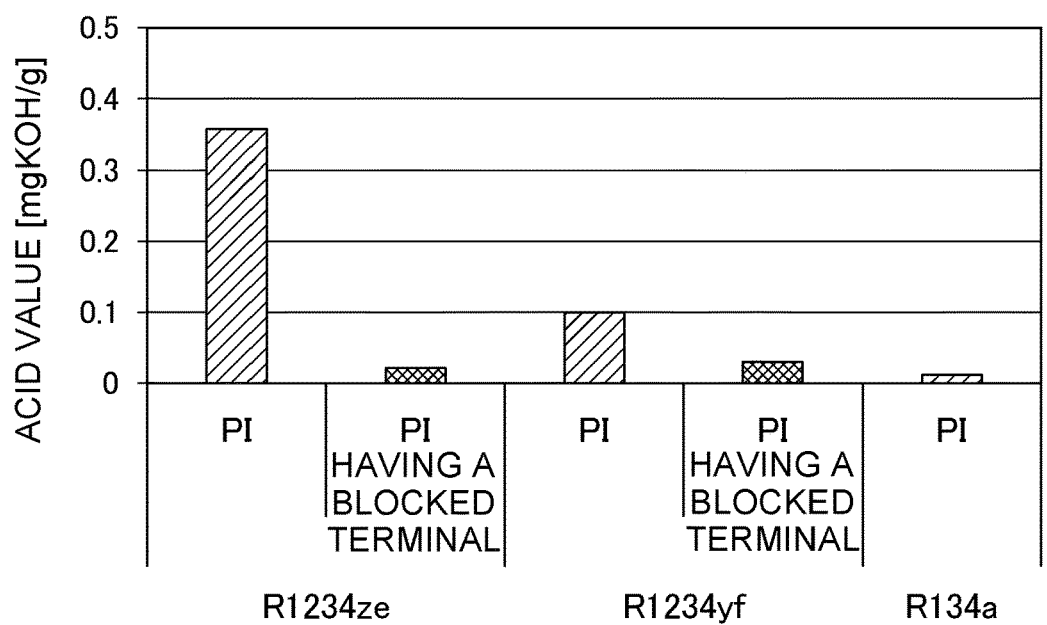
FIG. 7 shows test results on the tendency to generate an acid in a combination of a resin and a refrigerant.

FIG. 7 shows the test results. It is understood that the PI having a terminal blocked with a terminal group is less likely to generate an acid than the PI having an unblocked terminal.

(7) Characteristics 7-1

The motor 30 includes a resin component including a PI having a terminal blocked with a terminal group (that is, at least one of the insulating sheet 31d, the insulating covering of the electric wire 31e, the insulating sleeve 31f, the binding cord 31g, or the cluster block 31h). In the case of using such a resin component, the amount of the acid generated by the reaction between the resin component and an HFO-based refrigerant is smaller than in the case of using a resin component including a PI having an unblocked terminal. Therefore, the components in the refrigeration cycle system are less susceptible to corrosion by an acid.

7-2

The ratio of the resin component including a PI having a terminal blocked with a terminal group to the refrigerant is 0.2% by weight or more. This configuration therefore restrains acid generation since the resin component being large in amount is less susceptible to reaction with the HFO-based refrigerant.

7-3

The ratio of the acid scavenger to the refrigerant is 1.6% by weight or less. This configuration therefore restrains degradation in lubricity of the refrigerating machine oil owing to the acid scavenger.

7-4

The insulating covering of the electric wire 31e or the insulating sheet 31d includes a PI. This configuration therefore suppresses degradation in heat resistance of the motor.

7-5

In some embodiments, the components used in the motor 30 (that is, the insulating sleeve 31f and the binding cord 31g) also include a PI having a terminal blocked with a terminal group. This configuration restrains acid generation in the motor 30, and also restrains corrosion of the motor 30.

7-6

In some embodiments, the sliding portion such as the coating material of the expansion valve 5, the coating material of the motor 30, or the plain bearing of the shaft 40 includes a PI having a terminal blocked with a terminal group. This configuration restrains acid generation in the sliding portion, and also restrains corrosion of the sliding portion.

(8) Modified Examples

In the foregoing embodiment, the compressor 10 is a screw compressor. Alternatively, the compressor may be another type of compressor such as a scroll or rotary compressor.

<Conclusion>

The foregoing description concerns embodiments of the present disclosure. It will be understood that numerous modifications and variations may be made without departing from the gist and scope of the present disclosure in the appended claims.

What is claimed is:

1. A refrigeration cycle apparatus comprising:
a refrigerant; and
a refrigeration cycle circuit including a heat exchanger and a compressor, the refrigeration cycle circuit circulating the refrigerant,
the refrigerant being a single hydrofluoroolefin (HFO)-based refrigerant or a mixed refrigerant in which an HFO-based refrigerant is mixed at a mixing ratio of 10% by weight or more,
the compressor including a motor including a stator core, an electric wire covered with an insulating covering, and an insulating sheet provided on the stator core, and
at least one of the insulating covering and the insulating sheet being made of a resin material including a polyimide having a terminal blocked with a terminal group.

2. The refrigeration cycle apparatus according to claim 1, wherein
a ratio of the resin material to the refrigerant is 0.2% by weight or more.

3. The refrigeration cycle apparatus according to claim 1, further comprising:
a refrigerating machine oil stored in the compressor; and
an acid scavenger added to the refrigerating machine oil,
a ratio of the acid scavenger to the refrigerant being 1.6% by weight or less.

4. The refrigeration cycle apparatus according to claim 1, wherein
the motor further includes an insulating sleeve and a binding cord, and
at least one of the insulating sleeve and the binding cord is formed from the resin material.

5. The refrigeration cycle apparatus according to claim 1, further comprising:
a sliding portion including a polyimide having a terminal blocked with a terminal group.

6. A compressor configured to compress a refrigerant, the compressor comprising:
a motor including a stator core, an electric wire covered with an insulating covering, and an insulating sheet provided on the stator core,
the refrigerant being a single HFO-based refrigerant or a mixed refrigerant in which an HFO-based refrigerant is mixed at a mixing ratio of 10% by weight or more, and
at least one of the insulating covering and the insulating sheet being made of a resin material including a polyimide having a terminal blocked with a terminal group.

7. The refrigeration cycle apparatus according to claim 2, further comprising:
a refrigerating machine oil stored in the compressor; and
an acid scavenger added to the refrigerating machine oil,
a ratio of the acid scavenger to the refrigerant being 1.6% by weight or less.

8. The refrigeration cycle apparatus according to claim 2, wherein
the motor further includes an insulating sleeve and a binding cord, and
at least one of the insulating sleeve and the binding cord is formed from the resin material.

9. The refrigeration cycle apparatus according to claim 2, further comprising:
a sliding portion including a polyimide having a terminal blocked with a terminal group.

10. The refrigeration cycle apparatus according to claim 3, wherein
the motor further includes an insulating sleeve and a binding cord, and
at least one of the insulating sleeve and the binding cord is formed from the resin material.

11. The refrigeration cycle apparatus according to claim 3, further comprising:
a sliding portion including a polyimide having a terminal blocked with a terminal group.

12. The refrigeration cycle apparatus according to claim 4, further comprising:
a sliding portion including a polyimide having a terminal blocked with a terminal group.

* * * * *